(12) United States Patent
Cheru et al.

(10) Patent No.: US 11,030,156 B2
(45) Date of Patent: Jun. 8, 2021

(54) KEY-VALUE STORE WITH PARTIAL DATA ACCESS

(71) Applicant: SanDisk Technologies LLC, Plano, TX (US)

(72) Inventors: Tomy Cheru, Thrissur (IN); Brian O'Krafka, Austin, TX (US); Allen Samuels, San Jose, CA (US); Manavalan Krishnan, Fremont, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 1028 days.

(21) Appl. No.: 15/232,789

(22) Filed: Aug. 9, 2016

(65) Prior Publication Data

US 2017/0185625 A1    Jun. 29, 2017

Related U.S. Application Data

(60) Provisional application No. 62/271,892, filed on Dec. 28, 2015.

(51) Int. Cl.
   *G06F 16/174*   (2019.01)
   *G06F 16/21*    (2019.01)

(52) U.S. Cl.
   CPC ........ *G06F 16/1744* (2019.01); *G06F 16/217* (2019.01)

(58) Field of Classification Search
   CPC ..................... G06F 16/1744; G06F 16/217
   See application file for complete search history.

(56) References Cited

U.S. PATENT DOCUMENTS

| | | | | |
|---|---|---|---|---|
| 5,956,745 A | * | 9/1999 | Bradford | ............... G06F 3/0605 360/48 |
| 7,366,824 B2 | * | 4/2008 | Chiang | ................... G06F 8/658 711/100 |
| 7,477,547 B2 | | 1/2009 | Lin | |
| 8,612,402 B1 | | 12/2013 | Givargis | |
| 8,634,247 B1 | | 1/2014 | Sprouse et al. | |
| 8,909,657 B2 | | 12/2014 | Mensch et al. | |

(Continued)

FOREIGN PATENT DOCUMENTS

JP    2011065268 A  *  3/2011

OTHER PUBLICATIONS

Global Dossier English Language Translation of Obara (Year: 2011).*

*Primary Examiner* — Apu M Mofiz
*Assistant Examiner* — Farhad Agharahimi
(74) *Attorney, Agent, or Firm* — Kunzler Bean & Adamson, PC

(57) ABSTRACT

Apparatuses, systems, methods, and computer program products are disclosed for key-value stores with partial data access. An interface module is configured to receive a data object for storage in a key-value store. The data object may include a key and a value. A block object module is configured to generate a plurality of block objects smaller than the data object. A block object may include a new key and a new value. The new key may be based on the key for the data object and on metadata for the new value. The new value may be based on at least a portion of the value for the data object. A storage module is configured to store the block objects in the key-value store.

20 Claims, 8 Drawing Sheets

(56) References Cited

U.S. PATENT DOCUMENTS

| | | | |
|---|---|---|---|
| 2007/0033374 A1* | 2/2007 | Sinclair | G06F 12/0246 |
| | | | 711/203 |
| 2007/0061544 A1 | 3/2007 | Uppala | |
| 2010/0036887 A1 | 2/2010 | Anglin et al. | |
| 2010/0185690 A1* | 7/2010 | Evans | G06F 16/113 |
| | | | 707/803 |
| 2010/0228800 A1* | 9/2010 | Aston | G06F 3/0689 |
| | | | 707/822 |
| 2011/0099326 A1 | 4/2011 | Jung et al. | |
| 2012/0102298 A1 | 4/2012 | Sengupta et al. | |
| 2013/0103729 A1* | 4/2013 | Cooney | G06F 16/24568 |
| | | | 707/831 |
| 2013/0275656 A1 | 10/2013 | Talagala et al. | |

\* cited by examiner

KEY-VALUE STORE WITH PARTIAL DATA ACCESS

TECHNICAL FIELD

The present disclosure, in various embodiments, relates to data storage and more particularly relates to a key-value store.

BACKGROUND

Various data storage systems and applications, such as distributed data stores, NoSQL databases, and the like, use an object storage architecture in which data is stored and managed data as objects, rather than as blocks, files, or the like. An object may include a key-value pair, where the key is a unique identifier for the object and the value associated with the key includes data and/or metadata for the object. Different values may include varying quantities of data.

A key-value store, or object store, may return a value in response to a storage request that specifies the corresponding key. Thus, a storage request to read or modify a portion of a value may result in the full value being accessed. For example, modifying a portion of a value may involve reading the entire value, modifying the requested portion, and writing the complete modified value back to the key-value store. Accessing a full value when only a portion is requested is inefficient, particularly if the value is much larger than the requested portion. Accessing unrequested data may result in increased traffic on data buses, increased use of memory buffers, increased processing overhead, and increased wear for storage media.

SUMMARY

Methods are presented for key-value stores with partial data access. In one embodiment, a method includes receiving a data object for storage in a key-value store. In a further embodiment, the data object includes a key and a value. In a certain embodiment, the method includes generating a plurality of block objects smaller than the data object. In one embodiment, a block object includes a new key and a new value. In a certain embodiment, the new key is based on the key for the data object and on metadata for the new value. In a further embodiment, the new value is based on at least a portion of the value for the data object. In one embodiment, the method includes storing the block objects in the key-value store.

Computer program products including a computer readable storage medium are presented. In certain embodiments, a computer readable storage medium stores computer usable program code executable to perform operations for key-value stores with partial data access. In one embodiment, an operation includes receiving a first value associated with a first key, for storage in a key-value store. In a certain embodiment, an operation includes creating a set of new key-value pairs, including new values associated with new keys. In a further embodiment, the new values are of a block size. In one embodiment, a new value is based on a portion of the first value. In a certain embodiment, a new key is based on the first key and on metadata for an associated new value. In a further embodiment, an operation includes writing the new key-value pairs to the key-value store in place of the first key and the first value.

Apparatuses are presented for key-value stores with partial data access. In one embodiment, an apparatus includes a controller. In a certain embodiment, the controller is configured to receive a data object for storage in a key-value store. In a further embodiment, the data object includes a key and a value. In one embodiment, the controller is configured to generate a plurality of block objects smaller than the data object. In a certain embodiment, a block object includes a new key and a new value. In a further embodiment, the new key is based on the key for the data object and on metadata for the new value. In certain embodiments, the new value is based on a portion of the value for the data object. In a further embodiment, the controller is configured to store the block objects in the key-value store without storing the data object as a single object.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Figure 1:
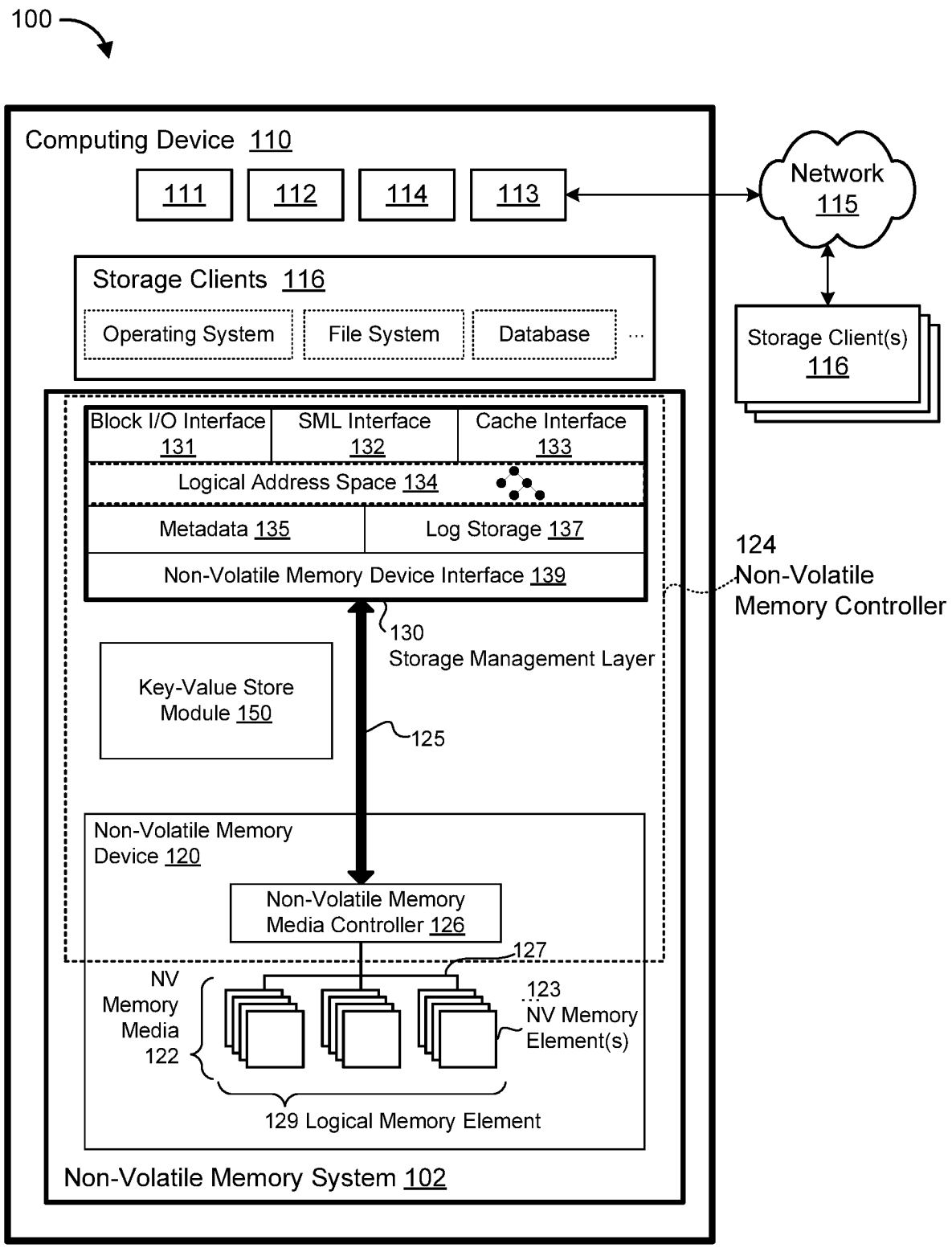
FIG. 1 is a schematic block diagram illustrating one embodiment of a system comprising a key-value store module.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures Like numbers may refer to like elements in the figures, including alternate embodiments of like elements.

FIG. 1 is a block diagram of one embodiment of a system 100 comprising a key-value store module 150. The key-value store module 150 may be part of and/or in communication with one or more of a non-volatile memory controller 124, a non-volatile memory media controller 126, a device driver or storage management layer (SML) 130, or the like. The key-value store module 150 may operate on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or non-volatile memory controller 124 to a communication network 115, such as an Internet Protocol network, a Storage Area Network, or the like.

The computing device 110 may further comprise a non-transitory, computer readable storage media 114. The computer readable storage media 114 may comprise executable instructions configured to cause the computing device 110 (e.g., processor 111) to perform steps of one or more of the methods disclosed herein. Alternatively, or in addition, the key-value store module 150 may be embodied as one or more computer readable instructions stored on the non-transitory storage media 114.

The non-volatile memory system 102, in the depicted embodiment, includes a key-value store module 150. The key-value store module 150, in one embodiment, is configured to provide a key-value store with partial data access. In one embodiment, the key-value store module 150 is configured to receive a data object for storage in a key-value store. In a further embodiment, the data object includes a key and a value. In a certain embodiment, the key-value store module 150 is configured to generate block objects smaller than the data object. In a further embodiment, the block objects include new keys and new values, where a new key is based on the key for the data object and on metadata for the new value, and the new value is based on at least a portion of the value for the data object. In one embodiment, the key-value store module 150 is configured to store the block objects in the key-value store. By storing block objects where the block object values are based on portions of the data object value, and the block object keys are based on the data object key with added metadata, the key-value store module 150 may, in various embodiments, allow partial access to the data object value. For example, in one embodiment, the key-value store module 150 may service a storage request for a portion of the data object value by accessing a block object values for a subset of the block objects, instead of by accessing the full data object value. In certain embodiments, accessing block object values without accessing the full data object value may avoid increasing the traffic on data buses, the use of memory buffers, processing overhead, and wear for storage media.

In one embodiment, the key-value store module 150 may comprise executable software code, such as a device driver, SML 130, or the like, stored on the computer readable storage media 114 for execution on the processor 111. In another embodiment the key-value store module 150 may comprise logic hardware of one or more non-volatile memory devices 120, such as a non-volatile memory media controller 126, a non-volatile memory controller 124, a device controller, a field-programmable gate array (FPGA) or other programmable logic, firmware for an FPGA or other programmable logic, microcode for execution on a microcontroller, an application-specific integrated circuit (ASIC), or the like. In a further embodiment, the key-value store module 150 may include a combination of both executable software code and logic hardware.

In one embodiment, the key-value store module 150 is configured to receive storage requests from the SML 130 via a bus 125 or the like. The key-value store module 150 may be further configured to transfer data to/from the SML 130 and/or storage clients 116 via the bus 125. Accordingly, the key-value store module 150, in some embodiments, may comprise and/or be in communication with one or more direct memory access (DMA) modules, remote DMA modules, bus controllers, bridges, buffers, and so on to facilitate the transfer of storage requests and associated data. In another embodiment, the key-value store module 150 may receive storage requests as an API call from a storage client 116, as an IO-CTL command, or the like. The key-value store module 150 is described in greater detail below with regard to FIGS. 3 and 4.

According to various embodiments, a non-volatile memory controller 124 comprising the key-value store module 150 may manage one or more non-volatile memory devices 120. The non-volatile memory device(s) 120 may comprise recording, memory, and/or storage devices, such as solid-state storage device(s), that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, erase blocks, sectors, blocks, collections or sets of physical storage locations (e.g., logical pages, logical erase blocks, described below), or the like.

The non-volatile memory controller 124 may comprise an SML 130, which may present a logical address space 134 to one or more storage clients 116. One example of an SML is the Virtual Storage Layer® of SanDisk Corporation of Milpitas, Calif. Alternatively, each non-volatile memory device 120 may comprise a non-volatile memory media controller 126, which may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

The SML 130 may maintain metadata 135, such as a forward index, to map logical addresses of the logical address space 134 to media storage locations on the non-volatile memory device(s) 120. The SML 130 may provide for arbitrary, any-to-any mappings from logical addresses to physical storage resources. As used herein, an "any-to any" mapping may map any logical address to any physical storage resource. Accordingly, there may be no pre-defined and/or pre-set mappings between logical addresses and particular, media storage locations and/or media addresses. As used herein, a media address refers to an address of a memory resource that uniquely identifies one memory resource from another to a controller that manages a plurality of memory resources. By way of example, a media address includes, but is not limited to: the address of a media storage location, a physical memory unit, a collection of physical memory units (e.g., a logical memory unit), a portion of a memory unit (e.g., a logical memory unit address and offset, range, and/or extent), or the like. Accordingly, the SML 130 may map logical addresses to physical data resources of any size and/or granularity, which may or may not correspond to the underlying data partitioning scheme of the non-volatile memory device(s) 120. For example, in some embodiments, the non-volatile memory controller 124 is configured to store data within logical memory units that are formed by logically combining a plurality of physical memory units, which may allow the non-volatile memory controller 124 to support many different virtual memory unit sizes and/or granularities.

As used herein, a logical memory element refers to a set of two or more non-volatile memory elements that are or are capable of being managed in parallel (e.g., via an I/O and/or control bus). A logical memory element may comprise a plurality of logical memory units, such as logical pages, logical memory divisions (e.g., logical erase blocks), and so on. As used herein, a logical memory unit refers to a logical construct combining two or more physical memory units, each physical memory unit on a respective non-volatile memory element in the respective logical memory element (e.g., each non-volatile memory element being accessible in parallel). As used herein, a logical memory division refers to a set of two or more physical memory divisions, each physical memory division on a respective non-volatile memory element in the respective logical memory element.

The logical address space 134 presented by the SML 130 may have a logical capacity, which may correspond to the number of available logical addresses in the logical address space 134 and the size and/or granularity of the data referenced by the logical addresses. For example, the logical capacity of a logical address space 134 comprising $2^{32}$ unique logical addresses, each referencing 2048 bytes (2 KiB) of data may be $2^{43}$ bytes. As used herein, a kibibyte (KiB) refers to 1024 bytes. In some embodiments, the logical address space 134 may be thinly provisioned. As used herein, a "thinly provisioned" logical address space 134 refers to a logical address space 134 having a logical capacity that exceeds the physical capacity of the underlying non-volatile memory device(s) 120. For example, the SML 130 may present a 64-bit logical address space 134 to the storage clients 116 (e.g., a logical address space 134 referenced by 64-bit logical addresses), which may exceed the physical capacity of the underlying non-volatile memory devices 120. The large logical address space 134 may allow storage clients 116 to allocate and/or reference contiguous ranges of logical addresses, while reducing the chance of naming conflicts. The SML 130 may leverage the any-to-any mappings between logical addresses and physical storage resources to manage the logical address space 134 independently of the underlying physical storage devices 120. For example, the SML 130 may add and/or remove physical storage resources seamlessly, as needed, and without changing the logical addresses used by the storage clients 116.

The non-volatile memory controller 124 may be configured to store data in a contextual format. As used herein, a contextual format refers to a self-describing data format in which persistent contextual metadata is stored with the data on the physical storage media 122. The persistent contextual metadata provides context for the data with which it is stored. In certain embodiments, the persistent contextual metadata uniquely identifies the data with which the persistent contextual metadata is stored. For example, the persistent contextual metadata may uniquely identify a sector or block of data owned by a storage client 116 from other sectors or blocks of data owned by the storage client 116. In a further embodiment, the persistent contextual metadata identifies an operation that is performed on the data. In a further embodiment, the persistent contextual metadata identifies a sequence of operations performed on the data. In a further embodiment, the persistent contextual metadata identifies security controls, a data type, or other attributes of the data. In a certain embodiment, the persistent contextual metadata identifies at least one of a plurality of aspects, including data type, a unique data identifier, an operation, and a sequence of operations performed on the data.

The persistent contextual metadata may include, but is not limited to: a logical address of the data, an identifier of the data (e.g., a file name, object id, label, unique identifier, or the like), reference(s) to other data (e.g., an indicator that the data is associated with other data), a relative position or offset of the data with respect to other data (e.g., file offset, etc.), data size and/or range, and the like. The contextual data format may comprise a packet format comprising a data segment and one or more headers. Alternatively, a contextual data format may associate data with context information in other ways (e.g., in a dedicated index on the non-volatile memory media 122, a memory division index, or the like).

In some embodiments, the contextual data format may allow data context to be determined and/or reconstructed based upon the contents of the non-volatile memory media 122, and independently of other metadata, such as the arbitrary, any-to-any mappings discussed above. Since the media location of data is independent of the logical address of the data, it may be inefficient or impossible to determine the context of data based solely upon the media location or media address of the data. Storing data in a contextual format on the non-volatile memory media 122 may allow data context to be determined without reference to other metadata. For example, the contextual data format may allow the metadata to be reconstructed based only upon the contents of the non-volatile memory media 122 (e.g., reconstruct the any-to-any mappings between logical addresses and media locations).

In some embodiments, the non-volatile memory controller 124 may be configured to store data on one or more asymmetric, write-once media 122, such as solid-state storage media. As used herein, a "write once" storage medium refers to a storage medium that is reinitialized (e.g., erased) each time new data is written or programmed thereon. As used herein, an "asymmetric" storage medium refers to a storage medium 122 having different latencies for different storage operations. Many types of solid-state storage media are asymmetric; for example, a read operation may be much faster than a write/program operation, and a write/program operation may be much faster than an erase operation (e.g., reading the media may be hundreds of times faster than erasing, and tens of times faster than programming the media).

The memory media 122 may be partitioned into memory divisions that can be erased as a group (e.g., erase blocks) in order to, inter alia, account for the asymmetric properties of the media 122 or the like. As such, modifying a single data segment in-place may require erasing the entire erase block comprising the data, and rewriting the modified data to the erase block, along with the original, unchanged data. This may result in inefficient "write amplification," which may excessively wear the media 122. Therefore, in some embodiments, the non-volatile memory controller 124 may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (e.g., the erasure latency is no longer part of the critical path of a write operation).

The non-volatile memory controller 124 may comprise one or more processes that operate outside of the regular path for servicing of storage operations (e.g., the "path" for performing a storage operation and/or servicing a storage request). As used herein, the "path for servicing a storage request" or "path for servicing a storage operation" (also referred to as the "critical path") refers to a series of processing operations needed to service the storage operation or request, such as a read, write, modify, or the like. The path for servicing a storage request may comprise receiving the request from a storage client 116, identifying the logical addresses of the request, performing one or more storage operations on non-volatile memory media 122, and returning a result, such as acknowledgement or data. Processes that occur outside of the path for servicing storage requests may include, but are not limited to: a groomer, de-duplication, and so on. These processes may be implemented autonomously and in the background, so that they do not interfere with or impact the performance of other storage operations and/or requests. Accordingly, these processes may operate independent of servicing storage requests.

In some embodiments, the non-volatile memory controller 124 comprises a groomer, which is configured to reclaim memory divisions (e.g., logical or physical erase blocks) for reuse, using a garbage collection or other storage capacity recovery process. The write out-of-place paradigm implemented by the non-volatile memory controller 124 may result in obsolete or invalid data remaining on the non-volatile memory media 122. For example, overwriting data X with data Y may result in storing Y on a new memory division (e.g., rather than overwriting X in place), and updating the any-to-any mappings of the metadata to identify Y as the valid, up-to-date version of the data. The obsolete version of the data X may be marked as invalid, but may not be immediately removed (e.g., erased), since, as discussed above, erasing X may involve erasing an entire memory division, which is a time-consuming operation and may result in write amplification. Similarly, data that is no longer is use (e.g., deleted or trimmed data) may not be immediately removed. The non-volatile memory media 122 may accumulate a significant amount of invalid data.

A groomer process may operate outside of the critical path for servicing storage operations. The groomer process may reclaim memory divisions so that they can be reused for other storage operations. As used herein, reclaiming a memory division refers to erasing the memory division so that new data may be stored/programmed thereon. Reclaiming a memory division may comprise relocating valid data on the memory division to a new location. The groomer may identify memory divisions for reclamation based upon one or more factors, which may include, but are not limited to: the amount of invalid data in the memory division, the amount of valid data in the memory division, wear on the memory division (e.g., number of erase cycles), time since the memory division was programmed or refreshed, and so on.

The non-volatile memory controller 124 may be further configured to store data in a log format. As described above, a log format refers to a data format that defines an ordered sequence of storage operations performed on a non-volatile memory media 122. In some embodiments, the log format comprises storing data in a pre-determined sequence of media addresses of the non-volatile memory media 122 (e.g., within sequential pages and/or erase blocks of the media 122). The log format may further comprise associating data (e.g., each packet or data segment) with respective sequence indicators. The sequence indicators may be applied to data individually (e.g., applied to each data packet) and/or to data groupings (e.g., packets stored sequentially on a memory division, such as an erase block). In some embodiments, sequence indicators may be applied to memory divisions when the memory divisions are reclaimed (e.g., erased), as described above, and/or when the memory divisions are first used to store data.

In some embodiments the log format may comprise storing data in an "append only" paradigm. The non-volatile memory controller 124, using the log storage module 137 described below or the like, may maintain a current append point at a media address of the non-volatile memory device 120. The append point may be a current memory division and/or offset within a memory division. Data may then be sequentially appended from the append point. The sequential ordering of the data, therefore, may be determined based upon the sequence indicator of the memory division of the data in combination with the sequence of the data within the memory division. Upon reaching the end of a memory division, the non-volatile memory controller 124 may identify the "next" available memory division (e.g., the next memory division that is initialized and ready to store data). The groomer may reclaim memory divisions comprising invalid, stale, and/or deleted data, to ensure that data may continue to be appended to the media log.

The log format described herein may allow valid data to be distinguished from invalid data based upon the contents of the non-volatile memory media 122, and independently of other metadata. As discussed above, invalid data may not be removed from the non-volatile memory media 122 until the memory division comprising the data is reclaimed. Therefore, multiple "versions" of data having the same context may exist on the non-volatile memory media 122 (e.g., multiple versions of data having the same logical addresses). The sequence indicators associated with the data may be used to distinguish invalid versions of data from the current, up-to-date version of the data; the data that is the most recent in the log is the current version, and previous versions may be identified as invalid.

The storage management layer 130 may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

The storage management layer 130 comprises and/or is communicatively coupled to one or more non-volatile memory devices 120. The one or more non-volatile memory devices 120 may include different types of non-volatile memory devices including, but not limited to: solid-state storage devices, hard drives, SAN storage resources, or the like. The one or more non-volatile memory devices 120 may comprise one or more respective non-volatile memory media controllers 126 and non-volatile memory media 122. As illustrated in FIG. 1, The SML 130 may provide access to the one or more non-volatile memory devices 120 via a traditional block I/O interface 131. Additionally, the SML 130 may provide access to enhanced functionality (e.g., a large, virtual address space 134) through the SML interface 132. The metadata 135 may be used to manage and/or track storage operations performed through any of the Block I/O interface 131, SML interface 132, cache interface 133, or other, related interfaces.

The cache interface 133 may expose cache-specific features accessible via the storage management layer 130. Also, in some embodiments, the SML interface 132 presented to the storage clients 116 provides access to data transformations implemented by the one or more non-volatile memory devices 120 and/or the one or more non-volatile memory media controllers 126.

The SML 130 may provide storage services through one or more interfaces, which may include, but are not limited to: a block I/O interface, an extended storage management layer interface, a cache interface, and the like. The SML 130 may present a logical address space 134 to the storage clients 116 through one or more interfaces. As discussed above, the logical address space 134 may comprise a plurality of logical addresses, each corresponding to respective media locations the on one or more non-volatile memory devices 120. The SML 130 may maintain metadata 135 comprising any-to-any mappings between logical addresses and media locations, as described above.

The SML 130 may further comprise a log storage module 137 that is configured to store data in a contextual, log format. The contextual, log data format may comprise associating data with persistent contextual metadata, such as the logical address of the data, or the like. The contextual, log format may further comprise associating data with respective sequence identifiers on the non-volatile memory media 122, which define an ordered sequence of storage operations performed on the one or more non-volatile memory devices 120, as described above.

The SML 130 may further comprise a non-volatile memory device interface 139 configured to transfer data, commands, and/or queries to the one or more non-volatile memory devices 120 over a bus 125, which may include, but is not limited to: a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the non-volatile memory controller 124 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The non-volatile memory controller 124 comprises one or more non-volatile memory devices 120. Although FIG. 1 depicts a single non-volatile memory device 120, the disclosure is not limited in this regard and could be adapted to incorporate any number of non-volatile memory devices 120.

The non-volatile memory device 120 may comprise non-volatile memory media 122, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like. While the non-volatile memory media 122 is referred to herein as "memory media," in various embodiments, the non-volatile memory media 122 may more generally comprise a non-volatile recording media capable of recording data, which may be referred to as a non-volatile memory media, a non-volatile storage media, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, and the like. A non-volatile memory media controller 126 may be configured to manage storage operations on the non-volatile memory media 122, and may comprise one or more processors, programmable processors (e.g., field-programmable gate arrays), or the like. In some embodiments, the non-volatile memory media controller 126 is configured to store data on and/or read data from the non-volatile memory media 122 in the contextual, log format described above, and to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. As discussed above, the logical memory element may be partitioned into respective logical memory units (e.g., logical pages) and/or logical memory divisions (e.g., logical erase blocks). The logical memory units may be formed by logically combining physical memory units of each of the non-volatile memory elements. For example, if the non-volatile memory media 122 comprises twenty-five (25) non-volatile memory elements, each logical memory unit may comprise twenty-five (25) pages (e.g., a page of each element of non-volatile memory media 122).

The non-volatile memory controller 124 may comprise an SML 130 and the non-volatile memory media controller 126. The SML 130 may provide storage services to the storage clients 116 via one or more interfaces 131, 132, and/or 133. In some embodiments, the SML 130 provides a block-device 110 interface 131 through which storage clients 116 perform block-level I/O operations. Alternatively, or in addition, the SML 130 may provide a storage management layer (SML) interface 132, which may provide other storage services to the storage clients 116. In some embodiments, the SML interface 132 may comprise extensions to the block device interface 131 (e.g., storage clients 116 may access the SML interface 132 through extensions to the block device interface 131). Alternatively, or in addition, the SML interface 132 may be provided as a separate API, service, and/or library. The SML 130 may be further configured to provide a cache interface 133 for caching data using the non-volatile memory system 102.

As described above, the SML 130 may present a logical address space 134 to the storage clients 116 (e.g., through the interfaces 131, 132, and/or 133). The SML 130 may maintain metadata 135 comprising any-to-any mappings between logical addresses in the logical address space 134 and media locations on the non-volatile memory device 120. The metadata 135 may comprise a logical-to-physical mapping structure with entries that map logical addresses in the logical address space 134 and media locations on the non-volatile memory device 120. The logical-to-physical mapping structure of the metadata 135, in one embodiment, is sparsely populated, with entries for logical addresses for which the non-volatile memory device 120 stores data and with no entries for logical addresses for which the non-volatile memory device 120 does not currently store data. The metadata 135, in certain embodiments, tracks data at a block level, with the SML 130 managing data as blocks.

The non-volatile memory system 102 may further comprise a log storage module 137, which, as described above, may be configured to store data on the non-volatile memory device 120 in a contextual, log format. The contextual, log data format may comprise associating data with a logical address on the non-volatile memory media 122. The contextual, log format may further comprise associating data with respective sequence identifiers on the non-volatile memory media 122, which define an ordered sequence of storage operations performed on the non-volatile memory media 122, as described above. The non-volatile memory controller 124 may further comprise a non-volatile memory device interface 139 that is configured to transfer data, commands, and/or queries to the non-volatile memory media controller 126 over a bus 125, as described above.

Figure 2:
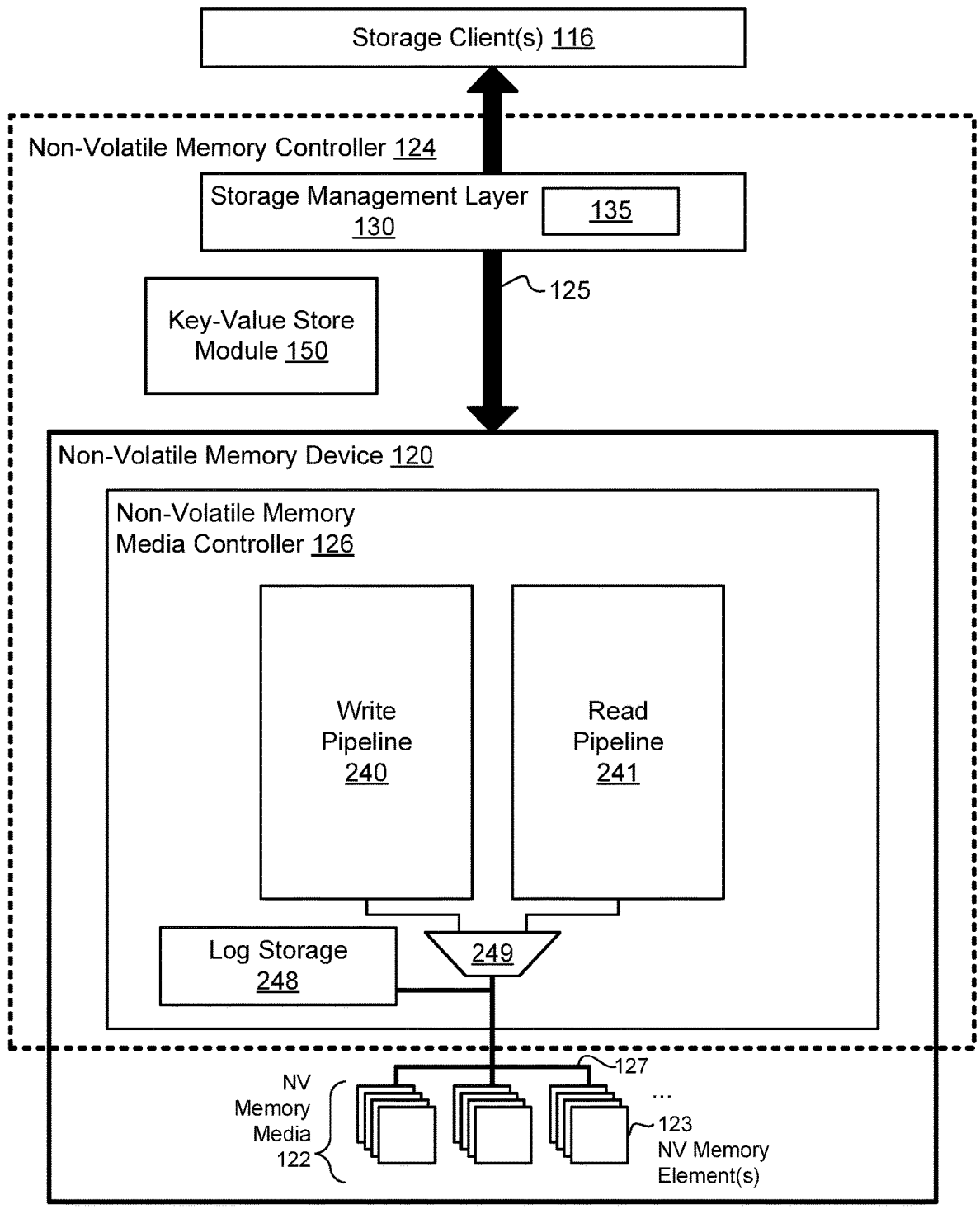
FIG. 2 is a schematic block diagram illustrating another embodiment of a system comprising a key-value store module.

FIG. 2 depicts another embodiment of a non-volatile memory controller 124 configured to provide a key-value store with partial data access. The non-volatile memory device 120 may comprise a non-volatile memory media controller 126 and non-volatile memory media 122. The non-volatile memory media 122 may comprise a plurality of non-volatile memory elements 123, which may be communicatively coupled to the non-volatile memory media controller 126 via a bus 127, as described above.

The non-volatile memory media controller 126 may comprise a write pipeline 240 that is configured to store data on the non-volatile memory media 122 in a contextual format in response to requests received via the key-value store module 150. The requests may include and/or reference data to be stored on the non-volatile memory media 122, may include keys for the data, and so on. As described above, the contextual format may comprise storing a logical address of the data in association with the data on the non-volatile memory media 122. For example, the write pipeline 240 may be configured to format data into packets, and may include the logical address of the data in a packet header or other packet field. The write pipeline 240 may be configured to buffer data for storage on the non-volatile memory media 122. In some embodiments, the write pipeline 240 may comprise one or more synchronization buffers to synchronize a clock domain of the non-volatile memory media controller 126 with a clock domain of the non-volatile memory media 122 and/or bus 127.

The log storage module 248 may be configured to select media location(s) for the data and may provide addressing and/or control information to the non-volatile memory elements 123 via the bus 127. In some embodiments, the log storage module 248 is configured to store data sequentially in a log format within the non-volatile memory media. The log storage module 248 may be further configured to groom the non-volatile memory media, as described above. In certain embodiments the log storage module 248 is substantially similar to the log storage module 137 as described above. The log storage module 248 may be executed by the SML 130 and/or by the non-volatile memory media controller 126.

Upon writing data to the non-volatile memory media, the non-volatile memory media controller 126 may be configured to update metadata 135 (e.g., a forward index) to associate the logical address(es) of the data with the media address(es) of the data on the non-volatile memory media 122. In some embodiments, the metadata 135 may be maintained on the non-volatile memory media controller 126; for example, the metadata 135 may be stored on the non-volatile memory media 122, on a volatile memory (not shown), or the like. Alternatively, or in addition, the metadata 135 may be maintained within the SML 130 (e.g., on a volatile memory 112 of the computing device 110 of FIG. 1). In some embodiments, the metadata 135 may be maintained in a volatile memory by the SML 130, and may be periodically stored on the non-volatile memory media 122.

The non-volatile memory media controller 126 may further comprise a read pipeline 241 that is configured to read contextual data from the non-volatile memory media 122 in response to requests received via the key-value store module 150. The requests may comprise a key for the requested data, an offset within the value for the requested data, and so on. The read pipeline 241 may be configured to read data stored in a contextual format from the non-volatile memory media 122 and to provide the data to the SML 130 and/or a storage client 116. The read pipeline 241 may be configured to determine the media address of the data using a logical address of the data and the metadata 135. Alternatively, or in addition, the SML 130 may determine the media address of the data and may include the media address in the request. The log storage module 248 may provide the media address to the non-volatile memory elements 123, and the data may stream into the read pipeline 241 via a buffer. The read pipeline 241 may comprise one or more read synchronization buffers for clock domain synchronization, as described above.

The non-volatile memory media controller 126 may further comprise a multiplexer 249 that is configured to selectively route data and/or commands to/from the write pipeline 240 and the read pipeline 241. In some embodiments, non-volatile memory media controller 126 may be configured to read data while filling a buffer of the write pipeline 240 and/or may interleave one or more storage operations on one or more banks of non-volatile memory elements 123 (not shown).

Figure 3:
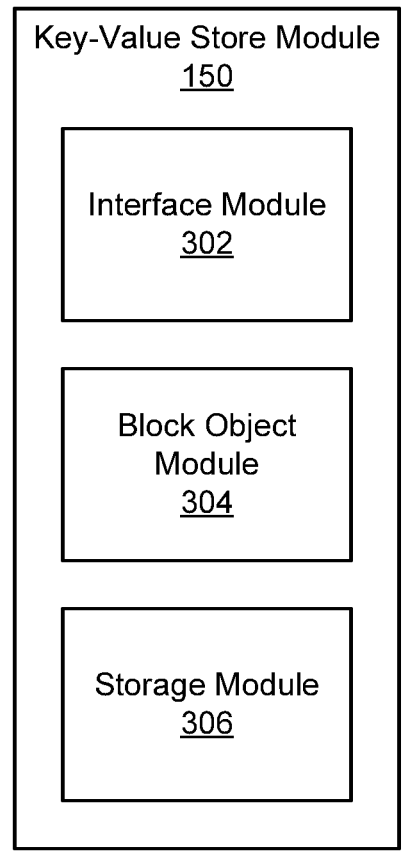
FIG. 3 is a schematic block diagram illustrating one embodiment of a key-value store module.

FIG. 3 depicts one embodiment of a key-value store module 150. The key-value store module 150 may be substantially similar to the key-value store module 150 described above with regard to FIG. 1. In general, as described above, the key-value store module 150 provides a key-value store with partial data access (e.g., access to portions of a data object without accessing the full data object) by receiving a data object, generating block objects smaller than the data object, and storing the block objects in the key-value store. In the depicted embodiment, the key-value store module 150 includes an interface module 302, a block object module 304, and a storage module 306.

In certain embodiments, a controller such as the non-volatile memory controller 124 or non-volatile memory media controller 126 may include the interface module 302, the block object module 304, and the storage module 306. In one embodiment, the controller may include a hardware controller, such as non-volatile memory media controller 126, for a storage device of a key-value store. In another embodiment, the controller may include a device driver, such as SML 130, for a storage-device of a key-value store. In a further embodiment, the device driver may include logic hardware and/or executable code stored on one or more computer readable storage media. In another embodiment, the controller may include a controller for a distributed data storage system that stores key-value pairs on multiple storage devices.

The interface module 302, in one embodiment, is configured to receive a data object for storage in a key-value store. In a certain embodiment, the data object may include a key and a value. For example, the interface module 302 may receive a value associated with a key, a key associated with a value, a key-value pair, or the like. In one embodiment, receiving the data object may include receiving the key and the value. In another embodiment, receiving the data object may include receiving the value and generating the key.

A key-value store, in various embodiments, may refer to a database, data storage system, data storage device, or the like, that stores data values associated with unique keys. A paired key and value may be described as a key-value pair, a key associated with a value, a value associated with a key, or the like. A key-value store may also be described herein as an object store for data objects that include keys and values, key-value pairs, or the like.

The values, in certain embodiments, may have variable lengths. For example, one data value may include 64 bytes of data, and another data value may include 1 terabyte of data, if the key-value store has sufficient available storage space. Further data values may include larger, smaller, or intermediate amounts of data. Values may include data and/or metadata, and may include data structures in various formats, so that a value may itself be a data object, or a set of data objects.

The keys, in certain embodiments, may be unique identifiers for the values, objects, or key-value pairs. For example, in one embodiment, a key may be a globally unique identifier (GUID). In certain embodiments, keys may be generated by storage clients 116. In some embodiments, values may be received from the storage clients 116, and the key-value store module 150 may generate keys and return the keys to the storage clients 116. In general, in various embodiments, associating a unique key with a value allows the value to be retrieved by specifying the corresponding key. For example, in one embodiment, an interface for a key-value store may receive a key from a storage client 116 and return the corresponding value.

The block object module 304, in one embodiment, is configured to create or generate a plurality of block objects, or a set of new key-value pairs. A block object, or a new key-value pair, may include a new key and a new value. Thus, a set of new key-value pairs may include multiple new values associated with new keys. In various embodiments, a new value for a block object may be based on at least a portion of the value for the data object received by the interface module 302. For example, in one embodiment, the block object module 304 may divide the data object value so that each new value includes a portion of the data object value. As a further example, in another embodiment, the block object module 304 may cooperate with a compression module (e.g., the compression module 418 described below with reference to FIG. 4) to compress and divide a data object value, so that each new value includes a portion of the compressed data object value, or a compressed portion of the data object value. In a certain embodiment, the block object module 304 may divide the data object value into segments and encode each segment with an error correcting code, so that each new value includes an encoded segment of the data object value. In view of this disclosure, many different ways for a block object module 304 to create a new value for a block object based on at least a portion of the value for a data object received by the interface module 302 will be clear.

In one embodiment, the block objects, or new values generated by the block object module 304 may be smaller than the data object (or the data object value) received by the interface module 302. For example, in one embodiment, the block objects may be of varying sizes but may be smaller than the data object received by the interface module 302. In another embodiment, however, the block object module 304 may generate new values of a block size, smaller than the size of the data object received by the interface module 302. In certain embodiments, a block size refers to a consistent, or substantially consistent size for new values based on at least a portion of the value for a data object. For example, a 1 GiB data value may be divided into multiple 8 KiB new values, with a block size of 8 KiB. However, a slightly larger data value may be divided into multiple 8 KiB new values, and one 2 KiB new value. Thus, a block size may be substantially consistent even if some values are less than a block size. Additionally, in some embodiments, a block size may be a maximum size for new values (e.g., if the new values are compressed), rather than a consistent size.

In one embodiment, the block object module 304 may use the same block size for multiple data objects received by the interface module 302, or for the full key-value store. In another embodiment, the block object module 304 may separately determine or assign a block size for separate data objects received by the interface module 302. Determining or assigning a block size is described further below with reference to the block size module 416 of FIG. 4.

In certain embodiments, the new keys generated or created by the block object module 304 for the block objects, or the new key-value pairs, and associated with the new values, may be generated so that a new key is based on the key for the data object received by the interface module 302 and on metadata for the associated new value. For example, in one embodiment, a new key may include a start offset and an end offset for the associated new value. In various embodiments, a start offset and/or an end offset may indicate positions, uncompressed data lengths, compressed data lengths, or the like in relation to the value for the data object received by the interface module 302. For example, in one embodiment, a start offset of 1024 and an end offset of 2047 may indicate that a new value includes bytes 1024 to 2047 of the original data value. In another embodiment, a start offset of 1024 may indicate that a new value is based on a portion of the original data value beginning at byte 1024, and the end offset may indicate the length of compressed data for the new value. In view of this disclosure, many ways are clear of using offsets to indicate the relation of a new value to an old value. Metadata for a new value may include offsets, positions, indicators of a compression algorithm, or any other metadata pertaining to the new value, or relating the new value to the portion of the original data value upon which the new value is based.

In one embodiment, the block object module 304 may append the start offset, end offset, and/or other metadata for a new value to the key for the data object received by the interface module 302, to generate the new key corresponding to the new value. For example, in a certain embodiment, the data object received by the interface module 302 may have a key of "EXAMPLE" and a 1 GiB value, and the block object module 304 may generate 8 KiB block object values with keys "EXAMPLE00000000000000000000000000008191," "EXAMPLE00000000000081920000000000016383," and so on, until "EXAMPLE000000010737336320000001073741823." Although appending offsets (and/or other metadata) to an original key is described herein, it is clear in view of this disclosure that there are many possible ways for the block object module 304 to create a new key based on an original key and on metadata for a new value. In general, in various embodiments, creating a new key based on an original key and on metadata for a new value allows an original data value to be broken up or otherwise transformed into multiple new values without separately maintaining an index or other data structure that relates the new values to the original value, because the metadata relating the new values to the original value is included in (or otherwise determinable from) the new keys.

The storage module 306, in one embodiment, stores the block objects from the block object module 304 in the key-value store. In a certain embodiment, the storage module 306 may store the block objects without storing the data object received by the interface module 302 as a single object. For example, the storage module 306 may write new key-value pairs for the block object to the key value store in place of the first key and the first value.

In general, in various embodiments, storing smaller block objects or values in place of a larger data object or value (e.g., without storing the larger data object as one object) may reduce write amplification for a storage medium. For example, if a 1 GiB data object is stored as a single data object, modifying a 1 KiB portion of the data object may involve reading the full data object, modifying the 1 KiB portion, and writing the complete 1 GiB modified object back to the key-value store. By contrast, if a 1 GiB data object is stored as a set of 8 KiB block objects, modifying a 1 KiB portion may involve reading, modifying, and re-writing one or two of the block objects, instead of the full data objects. Thus, wear on the storage media is reduced, as are the data traffic, temporary data storage, and processing overhead associated with the read-modify-write process.

In one embodiment, the storage module 306 or the key-value-store module 150 may maintain a lexicographic order for keys in the key-value store. For example, in one embodiment, values may be enumerating keys for the key-value store may return the keys in lexicographic (e.g., alphabetic, numeric, or alphanumeric) order. In another embodiment, values may be stored in a key-value store at logical or physical addresses in an order that corresponds to a lexicographic order for the keys. In view of this disclosure, many ways are clear of maintaining a lexicographic order for keys in a key-value store.

In a further embodiment, where keys are maintained in lexicographic order, the block object module 304 may generate keys for the block objects that maintain an order for the values of the block objects, such that the order for values of the block objects is based on the value for the data object originally received by the interface module 302. For example, in one embodiment, if the original data value is divided into segments with a start offset and an end offset, each segment may be a block object value, with a block object key that includes the original key with the start and end offset appended. Thus, if the new keys for the block object are maintained in lexicographic order, the new values will be in order such that the original data value may be reconstructed by concatenating the new values. In general, in various embodiments, storing or maintaining keys in lexicographic order and generating new keys that correspond to or maintain an order for the new values, may allow the original data value to be reconstructed without further sorting of the new keys or new values. In view of this disclosure, many ways are clear of generating new keys that maintain an order for the new values.

Figure 4:
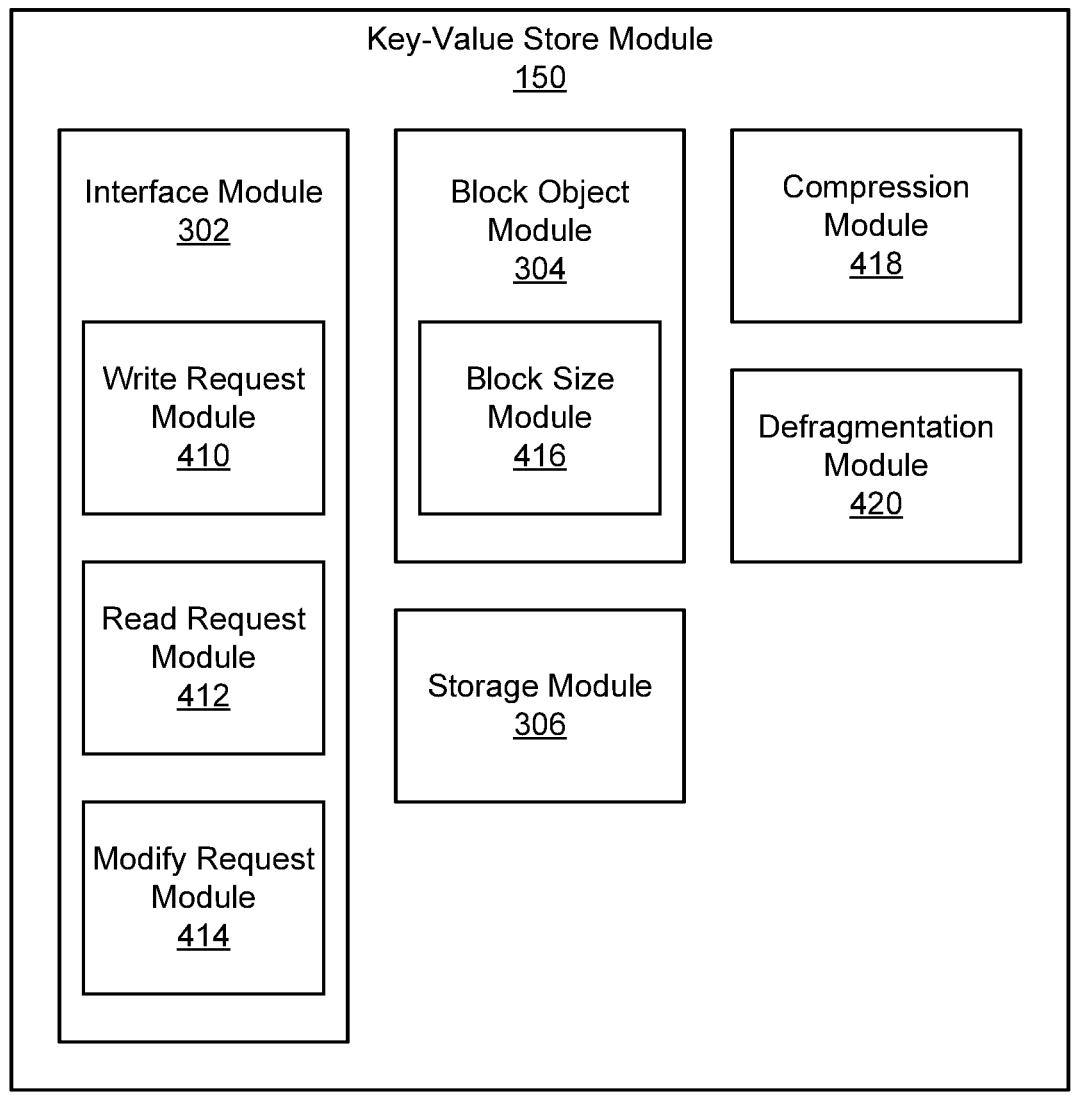
FIG. 4 is a schematic block diagram illustrating another embodiment of a key-value store module.

FIG. 4 depicts another embodiment of a key-value store module 150. The key-value store module 150, in certain embodiments, may be substantially similar to the key-value store module 150 described above with regard to FIG. 1, FIG. 2, and/or FIG. 3. In the depicted embodiment, the key-value store module 150 includes an interface module 302, a block object module 304, and a storage module 306, which may be configured substantially as described above with regard to FIG. 3. The interface module 302, in the depicted embodiment, includes a write request module 410, a read request module 412, and a modify request module 414. The block object module 304, in the depicted embodiment, includes a block size module 416. The key-value store module 150, in the depicted embodiment, includes a compression module 418 and a defragmentation module 420.

In one embodiment, the interface module 302 may receive storage requests for the key-value store. In various embodiments, storage requests may include write requests, to write a value to the key-value store, read requests, to read all or a portion of a data object, modify requests, to modify all or a portion of a data object, or the like. In certain embodiments, the interface module 302 may use the write request module 410, the read request module 412, and the modify request module 414 to satisfy storage requests.

In one embodiment, the interface module 302 may receive a write request to write a data object or store a value in the key-value store, and may use the write request module 410 to service the write request. The write request module 410 may communicate the key and value for the data object to the block object module 304, so that the block object module 304 may generate block objects that include new keys and new values for storage by the storage module 306, as described above with regard to FIG. 3.

In another embodiment, the interface module 302 may receive a storage request for a portion of a data object or data value that has already been written to the key-value store. For example, a storage request to read or modify a portion of a data object may include the key for the data object, an offset within the value for the data object, and a data length (e.g., for reading) and/or a data value for modifying the data object. In a further embodiment, the interface module 302 may identify block objects (or new key-value pairs) corresponding to the requested portion of the data object or data value, and may satisfy the storage request using the identified block objects (or key-value pairs).

For example, in one embodiment, where the storage request is a read request, the interface module 302 may use the read request module 412 to satisfy the read request. The read request module 412 may communicate with the block object module 304 and/or the storage module 306 to identify one or more of the block objects (or new key-value pairs) such that the identified block objects correspond to, or include, the requested portion of the data object or the original data value. For example, if the storage request includes the key "EXAMPLE," the read request module 412 may enumerate the new keys corresponding to the original key of "EXAMPLE," determine the offsets or other metadata upon which the new keys are based, and identify one or more block objects that can be used to satisfy the read request. The read request module 412 may then satisfy the read request using the identified block objects by reading the identified block objects, decompressing any compressed data, discarding data other than the requested portion, and returning the requested portion of the data block.

As a further example, in another embodiment, where the storage request is a modify request, the interface module 302 may use the modify request module 414 to satisfy the modify request. The modify request module 414 may communicate with the block object module 304 and/or the storage module 306 to identify one or more of the block objects (or new key-value pairs) such that the identified block objects correspond to, or include, the requested portion of the data object or the original data value. For example, if the storage request includes the key "EXAMPLE," the modify request module 414 may enumerate the new keys corresponding to the original key of "EXAMPLE," determine the offsets or other metadata upon which the new keys are based, and identify one or more block objects that can be used to satisfy the modify request. The modify request module 414 may then satisfy the modify request using the identified block objects by reading the identified block objects, decompressing any compressed data, modifying the requested portion of the data, and re-writing the modified block objects to the key-value store.

Thus, in various embodiments, by using the read request module 412 or the modify request module 414 as described above, the interface module 302 may service storage requests using the block objects, without accessing the full value for the original data object. In some embodiments, the interface module 302 may service storage requests transparently, without communicating to a storage client 116 that block objects are stored in place of a full data object. For example, in one embodiment, a storage client 116 may request an enumeration of keys in the key-value store, and the interface module 302 may enumerate the new keys, strip out the metadata for the new values, and return only the originally stored keys. In another embodiment, however, the interface module 302 may present an interface that allows storage clients 116 to access the block objects directly (e.g., using the new keys).

The block object module 304, in the depicted embodiment, may use the block size module 416 to determine, specify, or set a block size for the block objects. As described above with regard to FIG. 3, the block size module 416 may set a block size for the key-value store, or for individual data objects received by the interface module 302. In one embodiment, the block size module 416 may assign a block size based on a hardware block size for the key-value store, such as a logical or physical block size, logical or physical page size, or the like for a non-volatile memory device 120. In another embodiment, the block size module 416 may set or assign a block size based on an expected workload. For example, if a particular application is known to modify 100 bytes of data at a time, the block size module 416 may use a 100 byte block size. In one embodiment, the block size module 416 may use a user-selected block size. For example, in a certain embodiment, the block size module 416 may present an interface for a user to specify a block size for the key-value store. In another embodiment, the write request module 410 may receive a block size for a data object from a user with a write request, and the block size module 416 may communicate with the write request module 410 to use that block size for that data object. In a further embodiment, the block size for an object may be indicated by start and end offsets appended to the new keys, or otherwise indicated by the new keys.

The compression module 418, in one embodiment, is configured to compress the value for a data object received by the interface module 302 for storage in the key-value store. In a further embodiment, the new values created by the block object module 306 may be based on portions of the compressed original value. For example, in one embodiment, the compression module 418 may compress a data value, and the compressed value may be divided into segments of the block size specified by the block size module 416, so that the new values are segments of compressed data. In a further embodiment, the compression module 418 may decompress data of the block objects when the decompressed data will be used to satisfy a read or modify request, and may re-compress modified data when modified block objects are re-written to the key-value store.

In one embodiment, the block object module 304 may communicate with the compression module 318 and may generate new keys and new values such that the new keys indicated information about data compression for the new values. For example, in one embodiment, a new key may indicate whether the corresponding new value includes compressed data. In another embodiment, a new key may indicate a compression algorithm, a compression ratio, or the like, that was used to compress the data value. Thus, the information upon which the new keys are based may be used to indicate how the original data may be recovered from the new values, by using the correct decompression algorithm, or the like.

In certain embodiments, data compressed with a certain compression ratio may be less compressible when modified. Thus, a modify request for a data object may result in one or more block objects being modified and recompressed to a size greater than a block size for the block objects. Thus, in one embodiment, the block object module 304 and the storage module 306 may generate and store fragmented block objects to the key-value store in response to one or more modify requests for a data object. In a further embodiment, the fragmented block objects may include values of less than a block size. In a certain embodiment, if data of a block size is reserved for storage of a fragmented block objects, internal fragmentation may use additional storage space.

Accordingly, in one embodiment, the defragmentation module 420 is configured defragmenting the block objects (or new values) and the fragmented block objects (or values of less than a block size), by reading the block objects and the fragmented block objects and generating new block objects based on the block objects and the fragmented block objects. For example, in one embodiment, the defragmentation module 420 may generate replacement key-value pairs based on the values for the block objects and the values of less than a block size. In a further embodiment, the defragmentation module 420 may cooperate with the storage module 306 to save the new block objects, or replacement key-value pairs, to the key-value store.

For example, in one embodiment, the defragmentation module 420 may read the block objects and fragmented block objects corresponding to a full data object received by the interface module 302. In a further embodiment, the defragmentation module 420 may reconstruct the full (modified) value for the data object, and may communicate the full value to the block object module 304 for new keys and values to be generated. In another embodiment, the defragmentation module 420 may reconstruct a portion of the modified value for the data object, and may reduce data fragmentation for that portion by cooperating with the block module 304 to create new block objects for that portion.

In one embodiment, the fragmentation module 420 may defragment objects on a regular basis. In another embodiment, the fragmentation module 420 may defragment objects in response to determining that a fragmentation threshold is exceeded. In a certain embodiment, the fragmentation module 420 may defragment a data object in response to determining that a fragmentation threshold is exceeded by the data object. In another embodiment, the fragmentation module 420 may defragment multiple data objects in response to determining that a fragmentation threshold is exceeded by key-value store.

Figure 5A:
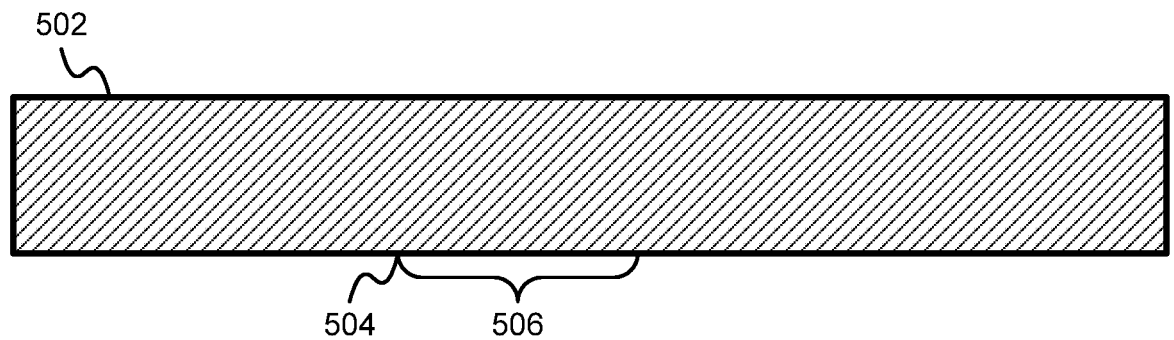
FIG. 5A is a schematic block diagram illustrating one embodiment of a data object.

FIG. 5A depicts a data object 502. The value for the data object 502 is depicted as an unbroken range of data (shaded). A request may be received to modify a portion 506 of the data object, beginning at start offset 504. Without generating block objects based on the data object 502, servicing the request may involve reading the entire data object 502, modifying the portion 506, and re-writing the entire data object 502 back to the key-value store.

Figure 5B:
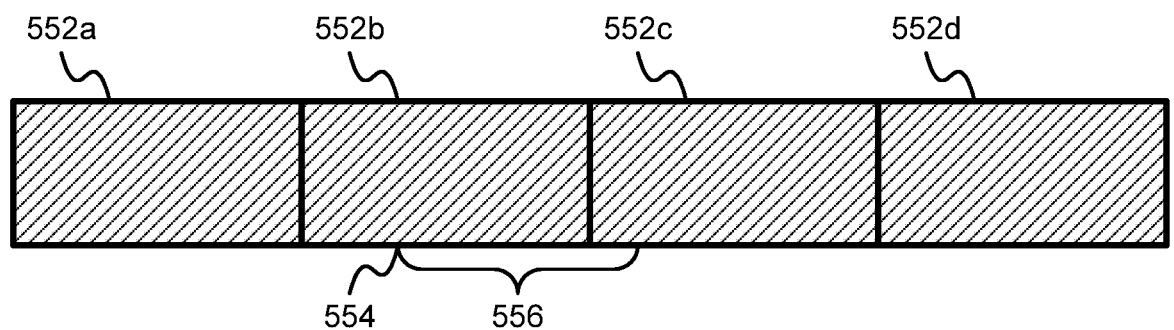
FIG. 5B is a schematic block diagram illustrating one embodiment of a plurality of block objects.

FIG. 5B depicts a plurality of block objects 552a-d based on the data object 502 of FIG. 5A, as described above with regard to the block object module 304 of FIG. 3 and FIG. 4. The block objects 552a-d may be individually accessed. A request may be received to modify a portion 556 of the data, beginning at start offset 554. By individually accessing, modifying, and rewriting block objects 552b and 552c, the request may be serviced without accessing or rewriting the data of block objects 552a and 552d, thus reducing write amplification.

Figure 6A:
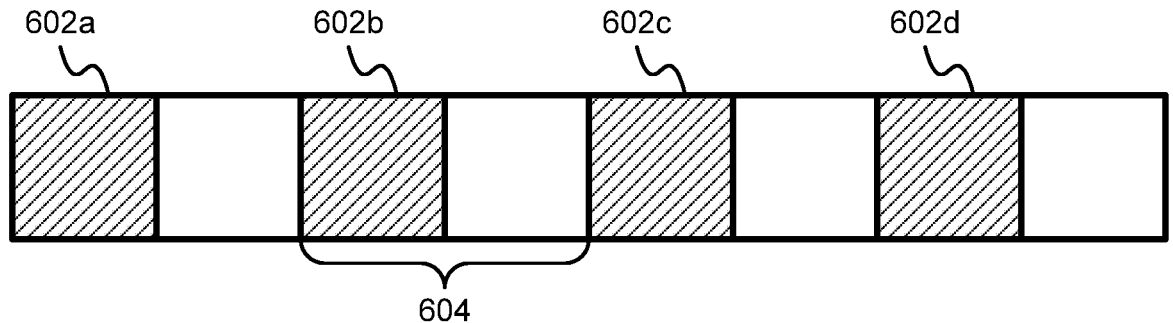
FIG. 6A is a schematic block diagram illustrating another embodiment of a plurality of block objects, with compressed data.

FIG. 6A depicts another embodiment of a plurality of block objects 602a-d, similar to block objects 552a-d of FIG. 5B, where the data of block objects 602a-d is compressed. In one embodiment, a key for one of the block objects 602a-d may include the same start offset as a key for the similar uncompressed block object 552a-d, and an end offset that indicates the length of the compressed data value for the block object 602a-d. In the depicted embodiment, the data compression ratio is approximately 2:1, so that a block size 604 for storing a block object includes approximately 50% compressed data (shaded), and approximately 50% empty space (unshaded). Thus, if a block size 604 is based on a hardware block size for the key-value store, such as a logical or physical block size, logical or physical page size, or the like, the compressed block objects 602a-d may be aligned with block boundaries for larger uncompressed blocks objects, leaving ranges of unused space of less than a block size. Small ranges of unused space less than a block size may be difficult to use in some embodiments, because a block object is too large to fit in the range of unused space.

Figure 6B:
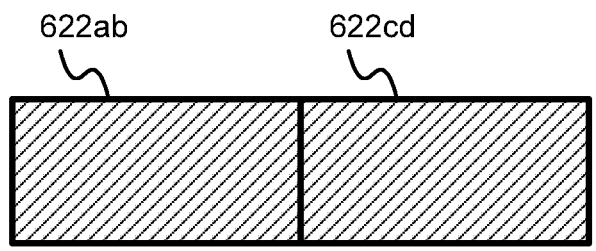
FIG. 6B is a schematic block diagram illustrating another embodiment of a plurality of block objects with compressed data.

FIG. 6B depicts another embodiment of a plurality of block objects 622 with compressed data. In the depicted embodiment, block object 622ab includes data of compressed block objects 602a and 602b from FIG. 6A, and block object 622cd includes data of compressed block objects 602c and 602d. By combining compressed data, wasted empty space within a block size is avoided. However, if the data is modified and is less compressible after modification, fragmented data may result, as shown in FIG. 6C.

Figure 6C:
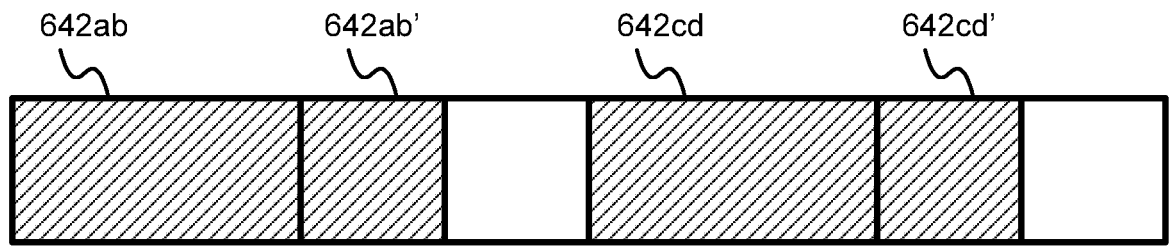
FIG. 6C is a schematic block diagram illustrating one embodiment of fragmented block objects.

FIG. 6C depicts one embodiment of block objects and fragmented block objects. In the depicted embodiment, a modification to block 622ab of FIG. 6B changed the data to be less compressible, resulting in the modified data being stored in block object 642ab, and fragmented block object 642ab', of less than the block size. A similar modification to block 622cd resulted in block object 642cd and fragmented block object 642cd'. Because the fragmented block objects 642ab' and 642cd' are of less than the block size, small ranges of unused space occur, as in FIG. 6A.

Figure 6D:
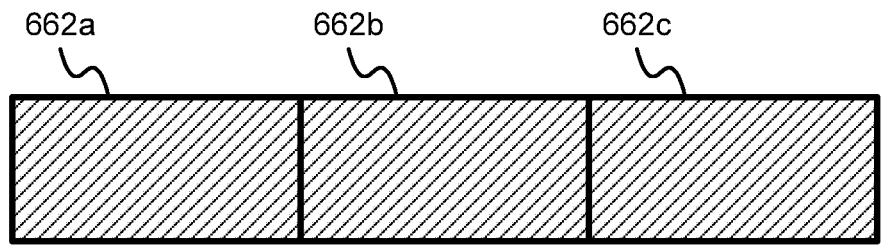
FIG. 6D is a schematic block diagram illustrating one embodiment of defragmented block objects.

FIG. 6D is a schematic block diagram illustrating one embodiment of defragmented block objects 662. In the depicted embodiment, a defragmentation module 420 reads the block objects and fragmented block objects 642 of FIG. 6C and generates new block objects 662 based on the block objects and fragmented block objects 642 of FIG. 6C, thus avoiding small ranges of unused space.

Figure 7:
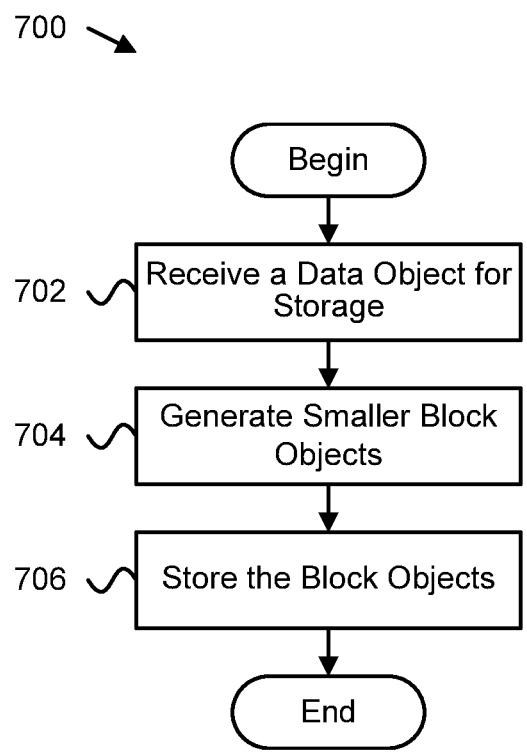
FIG. 7 is a schematic flow chart diagram illustrating one embodiment of a method for key-value data storage with partial data access.

FIG. 7 depicts one embodiment of a method 700 for key-value data storage with partial data access. The method 700 begins, and the interface module 302 receives 702 a data object for storage in a key-value store. The data object may include a key and a value. The block object module 304 generates 704 a plurality of block objects smaller than the data object. A block object may include a new key and a new value. The new key may be based on the key for the data object and on metadata for the new value. The new value may be based on at least a portion of the value for the data object. The storage module 306 stores 706 the block objects in the key-value store, and the method 700 ends.

Figure 8:
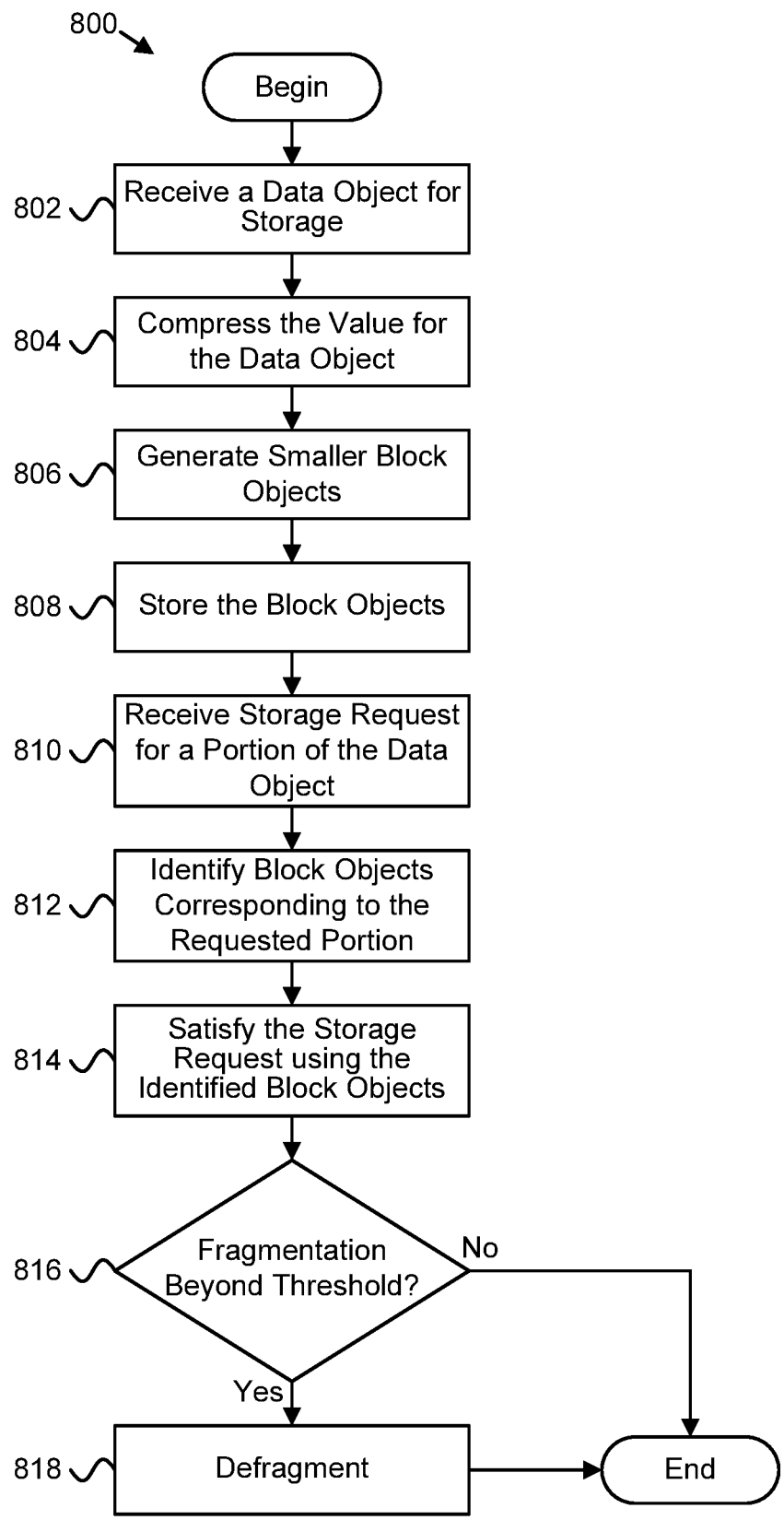
FIG. 8 is a schematic flow chart diagram illustrating another embodiment of a method for key-value data storage with partial data access.

FIG. 8 depicts another embodiment of a method for key-value data storage with partial data access. The method 800 begins, and the interface module 302 receives 802 a data object for storage in a key-value store. The data object may include a key and a value. The compression module 418 compresses 804 the value for the data object. The block object module 304 generates 806 a plurality of block objects smaller than the data object, as described above with reference to the method 700 of FIG. 7. The storage module 306 stores 808 the block objects in the key-value store. The interface module 302 receives 810 a storage request for a portion of the data object, and communicates with the block object module 304 and the storage module 306 to identify 812 block objects corresponding to the requested portion of the data object, and to satisfy 814 the storage request using the identified block objects. The fragmentation module 420 determines 816 whether fragmentation for the key-value store exceeds a fragmentation threshold. If fragmentation does not exceed the fragmentation threshold, the method 800 ends. If fragmentation exceeds the fragmentation threshold, the fragmentation module 420 defragments 818 one or more objects in the key-value store, and the method 800 ends.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
receiving a data object for storage in a key-value store, the data object comprising a key and a value;
generating a plurality of block objects smaller than the data object, wherein:
each block object of the plurality of block objects comprises a new key and a new value, the new key based on the key for the data object and on metadata for the new value, the new value based on at least a portion of the value for the data object, the new key comprises a start offset and an end offset for the new value, the start offset and the end offset appended to the key for the data object, the start offset indicates a first byte location within the data object, and the end offset indicates a second byte location within the data object; and storing the plurality of block objects in the key-value store.

2. The method of claim 1, further comprising compressing the value for the data object, wherein the new value is based on at least a portion of the compressed value for the data object.

3. The method of claim 2, further comprising:

storing fragmented block objects to the key-value store in response to one or more modify requests for the data object; and defragmenting the block objects and the fragmented block objects by generating new block objects based on the block objects and the fragmented block objects, and saving the new block objects to the key-value store.

4. The method of claim 2, wherein the new key indicates whether the new value comprises compressed data.

5. The method of claim 2, wherein the new key indicates a compression algorithm that was used to compress the value.

6. The method of claim 1, further comprising:

receiving a storage request for a portion of the data object;

identifying one or more of the plurality of block objects, the one or more identified block objects corresponding to the requested portion of the data object; and satisfying the storage request using the one or more identified block objects.

7. The method of claim 6, wherein the storage request comprises the key for the data object, an offset within the value for the data object, and one or more of a data length or a data value for modifying the data object.

8. The method of claim 1, wherein the key-value store maintains a lexicographic order for keys, and keys of the plurality of block objects are generated to maintain an order for values of the plurality of block objects, the order for values of the plurality of block objects based on the value for the data object.

9. The method of claim 1, wherein a block size for the plurality of block objects is based on one or more of a hardware block size for the key-value store, an expected workload, and a user-selected block size.

10. A computer program product comprising a non-transitory computer readable storage medium storing computer usable program code executable to perform operations, the operations comprising:

receiving a first value associated with a first key, for storage in a key-value store;

creating a set of new key-value pairs comprising new values associated with new keys, the new values of a block size, wherein:

a new value is based on a portion of the first value, a new key is based on the first key and on metadata for an associated new value, a new key comprises a start offset and an end offset for an associated new value, the start offset and the end offset appended to the first key, the start offset indicates a first byte location within the data object, and the end offset indicates a second byte location within the data object; and writing the new key-value pairs to the key-value store in place of the first key and the first value.

11. The computer program product of claim 10, further comprising compressing the first value, wherein new values are based on portions of the compressed first value.

12. The computer program product of claim 11, the operations further comprising:

storing values of less than a block size to the key-value store in response to one or more modify requests for the first value; and defragmenting the new values and the values of less than a block size by generating replacement key-value pairs based on the new values and the values of less than a block size, and saving the replacement key-value pairs to the key-value store.

13. The computer program product of claim 11, wherein a new key indicates whether a new value associated with the new key comprises compressed data.

14. The computer program product of claim 11, wherein a new key indicates a compression algorithm that was used to compress the first value.

15. The computer program product of claim 10, the operations further comprising:

receiving a storage request for a portion of the first value;

identifying one or more of the new key-value pairs, the one or more identified key-value pairs corresponding to the requested portion of the first value; and satisfying the storage request using the one or more identified key-value pairs.

16. The computer program product of claim 10, wherein the new key value pairs are stored to include the new keys and the new values stored together.

17. The computer program product of claim 15, wherein the storage request comprises the first key for the first value, an offset within the first value, and one or more of a data length or a data value for modifying the first value.

18. The computer program product of claim 10, wherein the key-value store maintains a lexicographic order for keys, and keys of the new keys are generated to maintain an order for values of the new keys, the order for values of the new keys based on the first value.

19. The computer program product of claim 10, wherein a block size for the new key-value pairs is based on one or more of a hardware block size for the key-value store, an expected workload, and a user-selected block size.

20. An apparatus comprising:

means for receiving a data object for storage in a key-value store, the data object comprising a key and a value;

means for generating a plurality of block objects smaller than the data object, wherein:

each block object of the plurality of block objects comprises a new key and a new value, the new key based on the key for the data object and on metadata for the new value, the new value based on a portion of the value for the data object, the new key comprises a start offset and an end offset for the new value, the start offset and the end offset appended to the key for the data object, the start offset indicates a first byte location within the data object, and the end offset indicates a second byte location within the data object; and means for storing the plurality of block objects in the key-value store without storing the data object as a single object, wherein the means for receiving, means for generating, and means for storing comprise one or more processors, one or more non-transitory computer readable storage mediums storing computer usable program code executable to perform operations, or a combination thereof.

\* \* \* \* \*